Nov. 23, 1937.  A. C. LEE ET AL  2,100,105

SIGNAL FOR AUTOMOBILES

Filed Dec. 26, 1934

Inventor
Albert C. Lee
and William Lee
By Roberts & Saunders
Attorneys

Patented Nov. 23, 1937

2,100,105

UNITED STATES PATENT OFFICE 2,100,105

SIGNAL FOR AUTOMOBILES

Albert C. Lee and William Lee, New Haven, Conn.

Application December 26, 1934, Serial No. 759,144

7 Claims. (Cl. 177—339)

Our invention relates to vehicle signals and more especially to signals adapted to be placed at appropriate places upon a vehicle such as an automobile or truck to indicate to pedestrians or drivers of other vehicles any change in either the speed or direction of the vehicle upon which the signals are mounted.

It is more or less common at the present time to have provided upon all automotive vehicles a signal light which will be illuminated when the operator of the vehicle applies the brake. This signal, being operated by the brake, does not give any indication if the vehicle is stopped by any other means, such as being slowed down by the engine itself when the operator releases the accelerator. Moreover, such a signal usually depends upon the completion of the electric circuit by the movement of the brake pedal and is likely to get out of order.

It is also common at the present time for some motor vehicles, particularly trucks, to be supplied with signal lights indicating right and left hand turns, as well as the so-called stop light. These turn signals are usually operated by the driver by means of a switch placed at a convenient point so that when a left-hand turn is about to be made, the switch is thrown in the proper direction to complete the circuit to the signal which will properly indicate such a turn. After the turn has been made, the switch is thrown to a neutral position by the operator. A similar procedure takes place when a right-hand turn is made.

It quite often occurs that after a turn has been made, the driver neglects to throw the switch back to a neutral position and the signal will remain illuminated, thus giving an erroneous indication to following vehicles.

One object of our invention is to provide a simple and inexpensive combined stop and turn signal for vehicles, which shall be more nearly automatic in its operation than those employed at the present time.

A further object of our invention is the provision of a stop signal for vehicles, which signal will become operative automatically whenever the speed of the vehicle is appreciably diminished, regardless of the cause of the change in speed.

A further object of the invention is the provision of a stop signal for vehicles which shall be entirely automatic in its operation and shall be controlled by the speed of the vehicle.

Still another object of the invention is the provision of a turn signal for vehicles adapted to indicate the direction in which the vehicle is to be turned, and which signal will be set manually by the driver but will automatically be restored to inoperative condition.

A still further object of the invention is the provision of a turn signal for vehicles which shall require no attention on the part of the operator except to be set to the proper position to indicate the desired turn before the turn has been made, and which will be simple and efficient in operation and economical to manufacture and install.

To these and other ends, the invention consists in the novel features and combinations of parts to be hereinafter described and claimed.

While in practice it will probably be found desirable to construct the stop and turn signals as a unit, the operation of one of these signals is largely separate and distinct from that of the other, so that they will be separately described.

Figure 1:
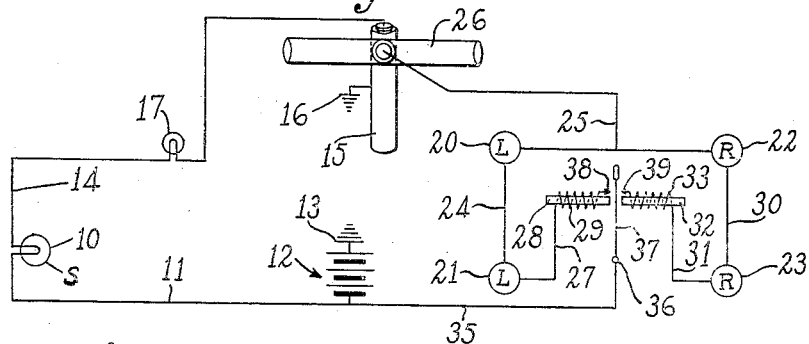
Fig. 1 is a view in diagrammatic form of a stop and turn signal mechanism embodying our invention.

To illustrate a preferred embodiment of our invention, we have shown in Fig. 1 of the drawing a stop signal which may comprise the ordinary stop light 10 usually mounted at the rear of a vehicle. This light is electrically connected by the conductor 11 to one pole of the battery, indicated at 12, the other pole of which is grounded as at 13.

The second lead 14 to the signal light 10 is carried to a tube 15 preferably made of metal or some conducting material which is grounded at 16. If desired, a dash indicating light 17 may be placed in series in the conductor 14 so as to indicate to the operator of the vehicle if the stop signal light is working.

Figure 5:
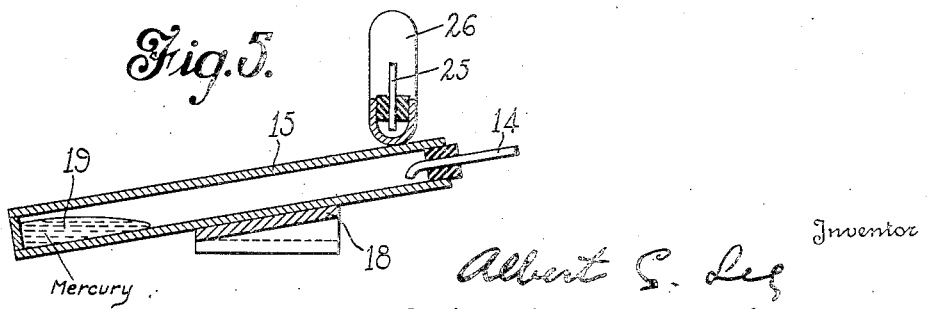
Fig. 5 is a sectional view on line 5—5 of Fig. 3.

The conductor 14 is insulated from the tube 15, as shown in Fig. 5. The connection of this conductor with the tube 15 may be made in a very simple and convenient manner by leaving the tube open at one end, as shown at Fig. 5, and inserting the insulated conductor 14 within the tube, the tube and conductor being so chosen that the external diameter of the insulation is substantially that of the interior bore of the tube, or of the same size as the opening in the tube so that the bore or opening will be completely closed by the insulation about the conductor. It will of course be understood that as the battery is grounded as at 13, the conductors 11 and 14 will both be insulated as is usual.

Figure 2:
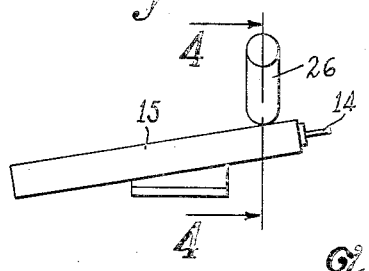
Fig. 2 is a side elevational view of the mechanism for making and breaking the circuits which operate the signals.

As has already been stated, the tube 15 may be, and preferably is, made of metal or some conductive material and may be secured to some part 18 of the frame so that it will be grounded upon the frame of the car and serve to complete the circuit to the battery. In case it is not convenient to mount the tube 15 directly upon a metal part of the vehicle, it may, of course, be so connected by a separate conductor. As shown in Figs. 2 and 5, the tube 15 is preferably mounted upon the vehicle in an inclined position with its forward end above its rear end. In practice it will be found that if this tube is inclined about 10° to the horizontal it will operate satisfactorily as this inclination would substantially correspond to a 20% grade, which is a higher grade than is usually encountered on a highway. A globule of mercury 19 is placed within the tube 15 and is free to move from one end of the tube to the other end under the influence of gravity or its own inertia.

It will be understood that in the operation of the vehicle when the latter is proceeding at a constant rate of speed or is being accelerated, the globule of mercury will remain at the rear end of the tube, as shown in Fig. 5, due to the fact that the tube is inclined and the force of gravity will maintain the mercury at the lower end of the tube. If, however, the speed of the vehicle is appreciably decreased, the inertia of the mercury will cause it to move to the forward end of the tube. When at the forward end of the tube, the mercury will complete the circuit between the conductor 14 and the tube 15 of conducting material which, as has been stated, is grounded upon the car. This will complete the circuit through the conductor 14, the signal light 10, the conductor 11, and battery 12 and cause the signal light 10 to be illuminated. It will be seen that this will be entirely automatic, requiring no attention on the part of the operator. Moreover, the signal will operate when the speed of the vehicle is decreased either through the application of the brake or when the operator's foot is removed from the accelerator and the engine acts as the brake.

When the vehicle comes to a stop or when it is again proceeding at a constant speed or accelerating, the globule of mercury will move to the rear end of the tube again and break the circuit through the signal light. Moreover, the signal light will not be illuminated as long as the vehicle is proceeding at a constant speed or accelerating unless it is proceeding down an unusually steep hill, in fact, one so steep that the tube 15 would be tipped downwardly toward its forward end. The position of the tube can of course be so arranged that this will not be true unless the hill is sufficiently steep, so that in any event the brake would probably be applied.

In conjunction with the stop light heretofore described, we propose to arrange signals to indicate right and left-hand turns to be made by the vehicle. For this purpose, the latter may be provided with front and rear electrically operated signals 20 and 21 to indicate a left-hand turn and similar front and rear signals 22 and 23 to indicate a right-hand turn. The signals 20 and 21 are connected in series by a conductor 24, and from the signal 20 a conductor 25 leads to a tubular member 26 which is designed to be grounded upon the vehicle and may conveniently be secured as by brazing or soldering to the tube 15. The tube 26 will likewise preferably be of conducting material and it will be understood that the conductors 24 and 25 will be insulated. A conductor 27 leads from the other terminal of the signal 21 to a magnet comprising a core 28 and solenoid 29, the latter being in series with the conductor 27. The right-hand signals 22 and 23 are similarly connected by a conductor 30, and the signal 23 is connected by a conductor 31 to a second magnet comprising the core 32 and solenoid 33. The signal 22 is connected to the conductor 25 which leads to the tube 26.

Figure 4:
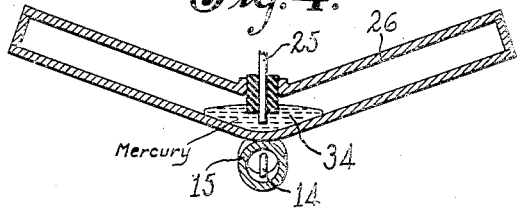
Fig. 4 is a sectional view on line 4—4 of Fig. 2.

As shown in Fig. 4, the tube 26 is of V-shaped form so that its central portion or the portion secured to the tube 15 is lower than its ends and the tube contains a globule of mercury 34. The conductor 25, which is an insulated conductor, may be conveniently connected to the tube by having its end pass through an opening arranged about the center of the tube at the top thereof, the opening being of such size that the insulation of the conductor completely fills the same. It will be understood that the conductor itself is also insulated from the tube except when a connection is made between it and the tube by the mercury 34, as shown in Fig. 4.

A lead 35 extends from a pole of the battery 12 to the base 36 of a manually operated switch member 37 so that the switch member carries the current from the battery. This switch member which is secured at the point 36 is preferably made of resilient material so that it will normally stand in a neutral position between the magnet cores 28 and 32. The solenoids 29 and 33 are provided with contacts 38 and 39 with which the switch 37 may engage when moved in one direction or the other from its normal position.

The operation of the turn signal is as follows: When the operator is about to make a turn, to the right, for example, he manually moves the switch 37 to the right, as shown in Fig. 1, so that the switch makes contact with the contact member 39 and thus completes the circuit from the battery through the solenoid 33, conductor 31, signals 22 and 23, conductor 25, mercury 34, and tube 26 to the ground on the vehicle. It will be understood that when the circuit is made through the solenoid 33, the core 32 will be magnetized and the switch member 37 will be held against the contact member 39 so that when the switch member 37 has once been moved to make the contact, it will be held in position as long as the circuit remains closed. The circuit will of course remain closed as long as the mercury is at the center of the tube 26, as shown in Fig. 4. When the vehicle begins to turn, centrifugal force will throw the mercury toward the left if a right-hand turn is being made so that it will leave the center of the tube and break the contact between the conductor 25 and the tube 26. This will not only serve to break the current through the signal and thus extinguish the latter, but will also serve to break the current through the solenoid 33, which will release the switch 37 and the latter will be moved back to neutral position by its own resiliency. A similar operation takes place when a left-hand turn is being made.

It will be seen that this signal needs only to be placed in operation by the movement of the switch member 37 by the operator. After that the operation of the signal is entirely automatic as the switch will be automatically moved back to neutral position when the turn is made, so that no attention on the part of the operator is required to place the signal out of operation. In this way, the signal cannot be left in operation inadvertently and thus give a wrong indication to other vehicles.

Figure 3:
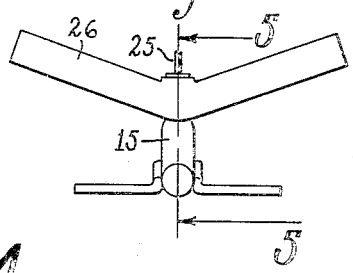
Fig. 3 is a rear elevational view of the device shown in Fig. 2.

It will be apparent that the tubular member 26, which extends upwardly in each direction from its central portion, may be considered as two separate tubes, one extending in each direction from the tube 15 as shown in Figs. 3 and 4, as each end of this tube performs a separate function. It could be made in two separate parts, but as the right and left-hand turn signals are never used at the same time, it is of course more economical to make the tube in this form with its ends at a higher level than its central portion and to use one lead wire 25 and one globule of mercury for the circuits to both of the turn signal lights.

While we have shown and described a preferred embodiment of our invention, it will be understood that it is not to be limited to all of the details shown, but is capable of modification and variation within the spirit of the invention and within the scope of the appended claims.

What we claim is:

1. A signal device for vehicles comprising a tube, means for rigidly supporting the tube on the frame of the vehicle, said tube being in an inclined position, a signal, an electric circuit leading to the signal and having spaced contacts in the lower end of said tube, a conducting liquid in said tube adapted to remain at the lower part thereof upon motion of said vehicle in a given direction and to be moved toward the elevated end of the tube upon a change in the direction of motion of said vehicle to make and break the circuit through said signal, a manually operated switch to close said circuit when said conducting liquid is in circuit-making position, and electrical means to maintain said circuit closed after manual release of said switch.

2. In a signal device for vehicles comprising a tube, means supporting said tube on the frame of the vehicle, said tube being in an inclined position, a signal, an electric circuit leading to the signal and having spaced contacts in the lower end of said tube, a conducting liquid in said tube adapted to remain at the lower part thereof upon motion of said vehicle in a given direction and to be moved toward the elevated end of the tube upon a change in the direction of motion of said vehicle to make and break the circuit through said signal, a manually operated switch to close said circuit when said conducting liquid is in circuit-making position, and electrical means to hold said manual switch in circuit-closing position until the circuit is broken by a change in motion of said vehicle.

3. In a signal device for vehicles comprising a tube, means supporting said tube on the frame of the vehicle, said tube being in an inclined position, a signal, an electric circuit leading to the signal and having spaced contacts in the lower end of said tube, a conducting liquid in said tube adapted to remain at the lower part thereof upon motion of said vehicle in a given direction and to be moved toward the elevated end of the tube upon a change in the direction of motion of said vehicle to make and break the circuit through said signal, a manually operated switch to close said circuit when said conducting liquid is in circuit-making position, said switch comprising a member normally urged to a neutral position, and magnetic means to hold said switch in closed position after manual movement of the switch to said position.

4. In a signal device for vehicles comprising a tube, means for rigidly supporting the tube upon the frame of the vehicle, said tube being in an inclined position, a signal, an electric circuit leading to the signal and having spaced contacts in the lower end of said tube, a conducting liquid in said tube adapted to remain at the lower part thereof upon motion of said vehicle in a given direction and to be moved toward the elevated end of the tube upon a change in the direction of motion of said vehicle to make and break the circuit through said signal, a manually operated switch to close said circuit when said conducting liquid is in circuit-making position, said switch comprising a member normally urged to a neutral position, and magnetic means to hold said switch in closed position after manual movement of the switch to said position, said magnetic means being energized by the current through the circuit to the signal.

5. In a signal device for vehicles comprising a signal, a tubular member, means for mounting said member upon the vehicle in an inclined position, a globule of mercury normally standing at the lower portion of said tubular member, an electric circuit leading to the signal and having spaced contacts closed by the mercury in its normal position, said mercury being adapted to be moved to circuit-breaking position by centrifugal force during a change in direction of the vehicle, a manually operable switch adapted to close the circuit through the signal, said switch being normally urged to open position, and magnetic means to hold said switch in circuit-closing position when the latter is moved thereto, said magnetic means being demagnetized when said circuit is broken by the movement of said mercury under centrifugal force.

6. In a signal device for vehicles, a tubular member, means supporting said member on a part of the vehicle and having its ends at a higher elevation than its central portion, electric circuits, each having spaced contacts adjacent the central portion of said tube, a globule of mercury normally lying at the central portion of said tube to close said contacts and adapted to be moved toward one or the other end of said tube by centrifugal force upon a change in direction of the vehicle, a manually operated switch to close said circuits, and electrical means to maintain said circuit closed after manual release of said switch.

7. In a direction signal device for vehicles, a source of current, two circuits operatively connected to said current source, a tubular member, means supporting said member upon a part of the vehicle and extending transversely to the direction of travel thereof and having its ends at a higher elevation than its central portion, a globule of mercury within said member normally lying at the central portion thereof, said circuits having in common spaced contacts adjacent the central portion of said tube to be closed by said mercury, manually operated means for closing one or the other of said circuits comprising a movable switch element, a conductor common to said circuits leading to said switch element, spaced contacts, one in each of said circuits on opposite sides of said switch element whereby the latter may be moved into engagement with one or the other of said contacts, and electrical means to maintain one of said circuits closed after said switch element has been moved into engagement with the respective contact.

ALBERT C. LEE.
WILLIAM LEE.